MULTIPLE-SETTING MAGNETIC CORE CIRCUITS

Filed June 12, 1958 3 Sheets-Sheet 1

INVENTORS.
DAVID R. BENNION
DOUGLAS C. ENGELBART
BY
Christie, Parker & Hale
ATTORNEYS.

INVENTORS.
DAVID R. BENNION
DOUGLAS C. ENGELBART
BY Christie, Parker & Hale
ATTORNEYS.

May 10, 1960 D. R. BENNION ET AL 2,936,445

MULTIPLE-SETTING MAGNETIC CORE CIRCUITS

Filed June 12, 1958 3 Sheets-Sheet 3

INVENTORS.
DAVID R. BENNION
DOUGLAS C. ENGELBART
BY Christie, Parker & Hale
ATTORNEYS.

United States Patent Office 2,936,445

Patented May 10, 1960

2,936,445

MULTIPLE-SETTING MAGNETIC CORE CIRCUITS

David R. Bennion, Loma Mar, and Douglas C. Engelbart, Palo Alto, Calif., assignors to Burroughs Corporation, Detroit, Mich., a corporation of Michigan Application June 12, 1958, Serial No. 741,687

11 Claims. (Cl. 340—174)

This invention relates to magnetic core circuits using multi-aperture core devices, and more particularly, in which an array of receiving core elements for storing binary bits can be set from a single core device.

In copending application Serial No. 698,633, filed November 25, 1957, in the name of Hewitt D. Crane, and assigned to the assignee of the present invention, there is described a core register having a novel transfer circuit requiring no diodes or other impedance elements in the transfer loops between cores. The basic binary storage element of this circuit is an annular core having input and output apertures therein. The binary zero digits are stored in the form of flux oriented in the same direction in the core on either side of the respective apertures, while the binary one digits are stored in the form of flux extending in opposite directions on either side of the respective apertures. Transfer is effected by applying a current pulse of predetermined magnitude to a coupling loop linking one aperture in each of the cores, one core constituting a transmitting core and the other core constituting a receiving core.

Two clock pulses are required per core element; one to clear the core for receiving information, and one for pulsing the transfer loop coupling the receiving core to the previous transmitting core. Moreover, generally two core elements are required for each information bit stored in the register, so that four clock pulse inputs are required for operating the register.

One of the significant features of the described magnetic core register is that each core element may have a plurality of input and output apertures for transferring information into the core from a plurality of sources and transferring information out of the core to a plurality of receiving elements. The difficulty with operating a circuit incorporating core elements having a plurality of inputs or a plurality of outputs is that the transfer loops linking the respective apertures in a given core element cannot be pulsed simultaneously for reading in or reading out information from the core element. This means that the same basic group of four clock inputs cannot be used for operating such a circuit, but sub-clock routines must be provided so as to avoid the coincident pulsing of multiple apertures in a single core element.

The present invention provides a magnetic core circuit arrangement using multiple-aperture cores within the principles of the above-identified copending application, but which permits reading into a single core element through separate transfer loops linking separate input apertures, or reading out from a single core element by separate output transfer loops linking separate output apertures with the four basic clock inputs. Thus the present invention obviates the need for sub-clock routines, thereby greatly simplifying the control circuitry for complex logic circuits employing the principles of the above-identified copending application. This improved mode of operation is achieved in the present invention by utilizing the clock pulse generated for clearing a core to simultaneously effect transfer between a different set of cores. Since the clear pulse normally does not coincide with the clock pulse used for advancing information between cores, the problem of simultaneous reading in or reading out from a particular core may be avoided and an extra transfer be effected within the same basic group of four clock pulses.

In brief, the fundamental circuit incorporating the features of the present invention includes at least three multi-aperture annular magnetic core elements. The first and second of the core elements may be part of a chain forming a register according to the principles of the above-identified copending application. These two cores each include coupling loops between apertures in the cores. Four basic clocks are provided for respectively clearing the first core, transferring information into the first core, clearing the second core, and transferring information from the first core into the second core. The second core has two output apertures, one of which is coupled by a transfer loop linking the core to the next core in the register chain. The second output aperture is linked by a transfer loop linking it to a third core element. This transfer loop is pulsed by the same clock that clears the first core element. The third core element may be cleared at the same time the second core element is cleared.

In this way transfer to the third core element from the second core element takes place at clear time rather than advance time and therefore is not simultaneous with either reading in or reading out of the second core element as it operates in the chain. Moreover, if the third core element forms a part of a second chain, reading into the third core element is not simultaneous with either the reading into or the reading out of the third core element as part of its own chain.

A better understanding of the operation and advantages of the circuit of the present invention may be had by reference to the accompanying drawings, wherein.

Figures 1, 2, 3:
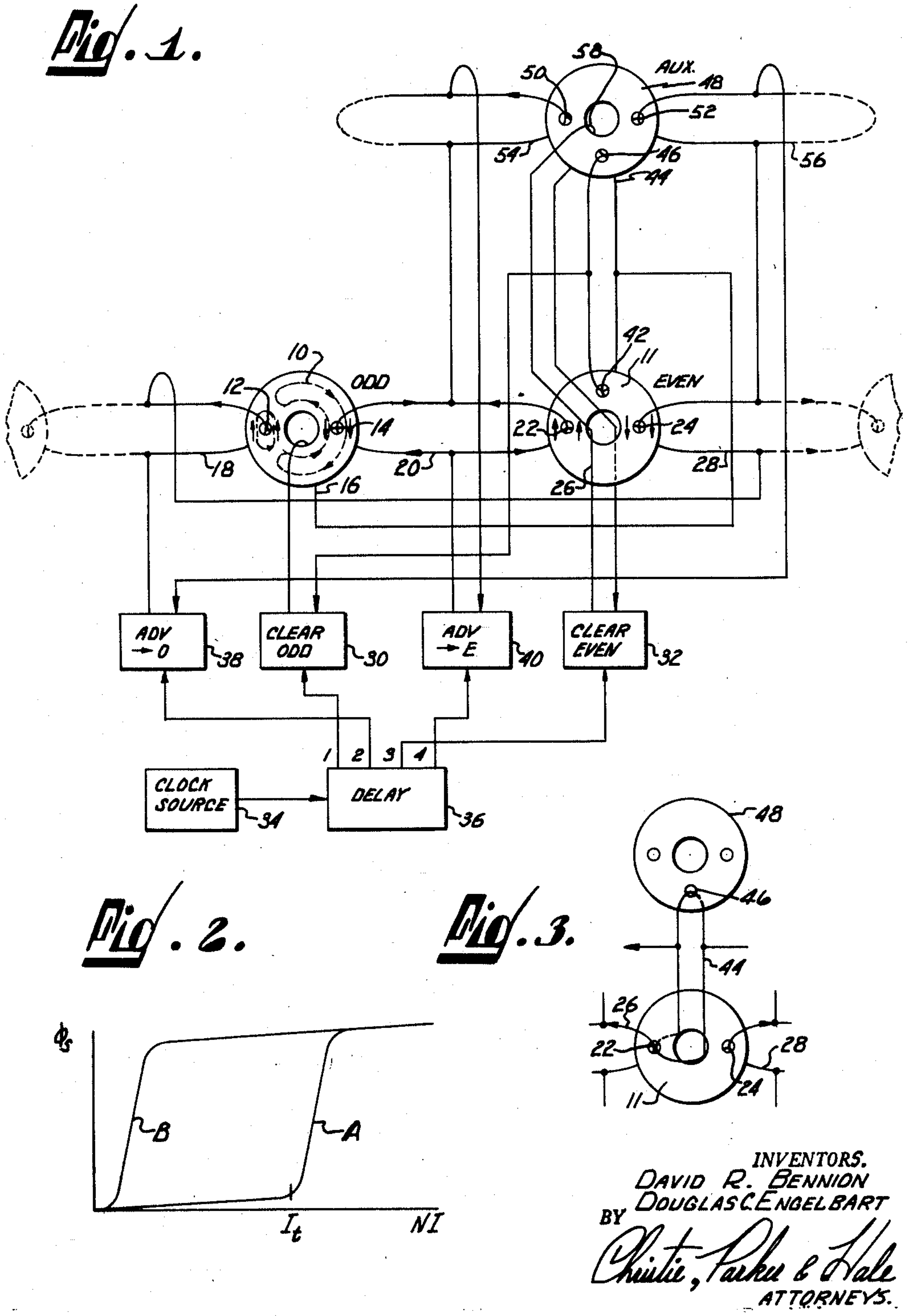
Fig. 1 is a schematic diagram of the basic circuit incorporating the features of the present invention.
Fig. 2 is a graphical representation useful in explaining the operation of the invention.
Fig. 3 is a schematic diagram of a modification of the circuit of Fig. 1.

Referring to Fig. 1 in detail, a pair of annular core elements 10 and 11 made of a magnetic material such as ferrite, having a square hysteresis loop, i.e., material having a high flux retentivity or remanence, is shown.

The annular core 10 is preferably provided with two small apertures 12 and 14, each of which divides the annular core into two parallel flux paths as indicated by the arrows. If a large current is pulsed through the central opening in the core 10, as by clearing winding 16, the flux in the core may be saturated in a clockwise direction. The core is then said to be in a cleared or binary zero condition. If a large current is passed through either of the apertures 12 or 14, as by the respective windings 18 and 20 in the direction indicated, and the current is of sufficient magnitude to cause switching of flux around the central opening of the annular core, a portion of the flux can be reversed so that flux extends in opposite directions on either side of the respective apertures 12 and 14. The core is then said to be in the set or binary one state.

The core 11 is similarly provided with an input aperture 22 and an output aperture 24. The input aperture is linked by a winding which is connected in shunt with a winding linking the output aperture 14 to form a transfer loop 20 coupling the core element 10 to the core element 11. The output aperture 24 is linked by a winding 28 which may be part of a loop coupling the core element 11 to a subsequent core element in a chain forming a shift register, for example. A clearing winding 26 links the central opening in the annular core element 11.

The circuit thus far described incorporating the core elements 10 and 11 is identical to the core register circuit described in the above-identified copending application. A significant aspect of the transfer circuit between core elements is that with a given number of turns linking one of the small apertures in the core and with the core in its cleared state as shown by the arrows in Fig. 1, a current exceeding a threshold value $I_t$ must be provided to change the core to its set state. This is illustrated by curve A of Fig. 2 which shows a plot of flux switched in the core element as a function of ampere-turns NI linking an aperture therein. With the core element in its cleared state, a pulse applied to a winding linking one of the small apertures can only switch flux around the relatively long flux path formed by the large central opening. The ampere-turns must be increased up to a threshold level corresponding to a current $I_t$, assuming a fixed number of turns, before an appreciable amount of flux can be switched in the core, as shown by curve A in Fig. 2. The aperture is said to be "blocked" when the current passing through the aperture must exceed the threshold value $I_t$ in order to switch any flux in the core element.

On the other hand, if the core is already in its set state, a very small current substantially less than the threshold value $I_t$ causes flux to switch locally about the relatively short flux path around the aperture. The amount of flux switched around this relatively small flux path as a function of the ampere-turns is shown by curve B in Fig. 2. In this case, the aperture is said to be "unblocked."

Thus if a current slightly less than the threshold value of current $I_t$ is passed through an aperture in a core element, flux will be switched or not switched within the core, depending upon whether the core is in its cleared state or in its set state, i.e., depending upon whether the aperture is blocked or unblocked.

Suitable means is provided for generating clearing pulses through the respective windings 16 and 26, as by means of clear pulse generators indicated at 30 and 32 respectively.

Clear pulse generators are pulsed from a clock source 34 coupled to a delay network 36 by means of which four successively delayed clock pulses are derived from each pulse from the source 34. The first and third pulses in terms of time from the output of the delay circuit 36 respectively pulse the clear pulse generator 30 and then the clear pulse generator 32.

If additional core elements are provided in the chain, the clear pulse generator 30 is used to clear all the odd core elements in the chain while the clear pulse generator 32 is used to simultaneously clear all the even core elements in the chain.

Means is provided for applying a unidirectional current of predetermined level through the respective transfer loops between core elements. Thus an advance pulse generator 38 is provided for applying current through the input winding 18 of the core element 10, and applying a current to the output winding 28 of the core element 11. A similar advance pulse generator 40 is provided for applying a current through the transfer loop 20. Again where a number of core elements are provided in the chain, the same advance pulse generator 38 may apply a current to the transfer loops which transfer information from the even core elements to the odd core elements while the advance pulse generator 40 applies a current to each of the transfer loops linking the odd core elements to the even core elements. The advance pulse generators 38 and 40 are pulsed from the output of the delay line 36 by the second and fourth pulses derived in that order from the output of the delay line 36. The peak current from the sources 38 and 40 is regulated to a level slightly less than twice the threshold level $I_t$ required to switch flux in a core in which the input and output apertures are blocked.

In operation, following a pulse from the clock source 34, the core 10 is cleared by the first output of the delay 36 actuating the generator 30, so that the apertures 12 and 14 are blocked. The resulting flux condition of the core 10 is indicated by the solid arrows. Next, the advance pulse source 38 is activated by the second output of the delay 36. The current divides between the two shunt windings linking the two cores. If the core preceding the core 10 in the chain has its output aperture blocked, i.e., is storing a binary zero, the current divides equally between the two windings of the coupling loop. The portion of the current passing through the winding 18 is therefore below the threshold level $I_t$ and no flux is switched in the core 10.

However, if the core preceding the core 10 in the chain has its output aperture unblocked, i.e., is storing a binary one, the current does not divide equally between the two windings of the coupling loop. The current passing through the output aperture of the preceding core is sufficient to switch flux around the small path surrounding the unblocked aperture. The effective impedance of this current path, therefore, is increased, so that a larger portion of the current from the source 38 is diverted through the winding 18 linking the input aperture 12. The resulting increased current level exceeds the threshold $I_t$ in the winding linking the aperture 12 and results in the switching of flux in the core 10. The resulting flux patterns of core 10 in such case is indicated by the dotted lines. Thus, the output aperture 14 is unblocked by the advance pulse from the source 38 only when the preceding core is in the binary one state.

Next, the core 11 is cleared by the third output from the delay 36 activating the current pulse source 32, and finally, the advance pulse source 40 is activated by the fourth output from the delay 36. Again, the advance pulse current divides equally between the two windings of the loop 20 if the aperture 14 is blocked, but divides unequally if the aperture 14 is unblocked. The result is to either leave the output aperture 24 blocked or to switch flux around the core and render the aperture unblocked, depending on the flux condition of the core 10.

The circuit of Fig. 1 as thus far described is identical to the core register circuit described in the above-mentioned copending application Serial No. 698,633. According to the present invention, however, the core element 11 is provided with an auxiliary output aperture 42 which is linked by a transfer loop 44. The transfer loop 44 also links an input aperture 46 in an auxiliary core element 48 which is identical to the core element 11.

The auxiliary core element 48 includes input and output apertures 50 and 52 respectively, which are linked by input and output windings 54 and 56 respectively. The auxiliary core element may, for example, be part of a second register chain or other magnetic core circuit in which the windings 54 and 56 respectively are part of input and output transfer loops which may be energized from the advance pulse sources 40 and 38 respectively as shown. The auxiliary core element 48 is provided with a clearing winding 58 which links the core element through the large central opening therein. The winding 58 may be connected in series with the winding 26 to the clear pulse generator 32, whereby the core elements 11 and 48 are simultaneously cleared. The transfer loop, which links the core elements 11 and 48 through the apertures 42 and 46 respectively, is identical to the transfer loop 20. The loop is connected in series with the clearing winding 16 associated with the core element 10 so as to be energized by the same current from the clearing pulse source 30. Again, current from the source 30 divides between the windings of the loop 44 either equally or unequally, depending on the condition of the flux around the aperture 42. If the aperture 42 is blocked, the core 48 remains cleared, but if the aperture 42 is unblocked, flux is switched in the core 48 and the core is changed to its set state.

It will be appreciated that the number of turns in the clearing winding 16 will be considerably higher than the number of turns in the respective windings of the transfer loop 44 in order that the same current level in the series connected windings produces saturation of flux in the core element 10 while producing an ampere-turns in the transfer loop which is below the threshold at which flux may be switched around the associated core element. In this manner the pulse that clears the core element 10 effects transfer of information between the core element 11 and auxiliary core element 48. Pulsing the transfer loop 44 at clear time for the core element 10 insures that transfer to the auxiliary core element 48 takes place at a time when the core element 11 is not, as part of the register chain, being read into, read out of, or being cleared. In this manner, utilizing the same basic four clock pulse cycle derived from the delay line 36 which operates the register chain including the core elements 10 and 11, information can be transferred to an auxiliary chain including the core element 48.

Fig. 3 shows an alternative arrangement for coupling the auxiliary core element 48 to the core element 11. In this case, instead of providing an additional output aperture in the core element 11, the transfer loop links the inside leg formed by the aperture 22. The winding of the transfer loop is connected so that transfer current applied to the loop flows in the opposite direction through the aperture 22 from the transfer current applied to the winding 26. In this manner the input aperture 22, acting as an output aperture for transfer to the core element 48, is unblocked by the reading in of a binary one from the core element 10 by means of the input winding 26, i.e., flux can be switched locally around the aperture 22 by the advance current applied to the transfer loop 44.

Figure 4:
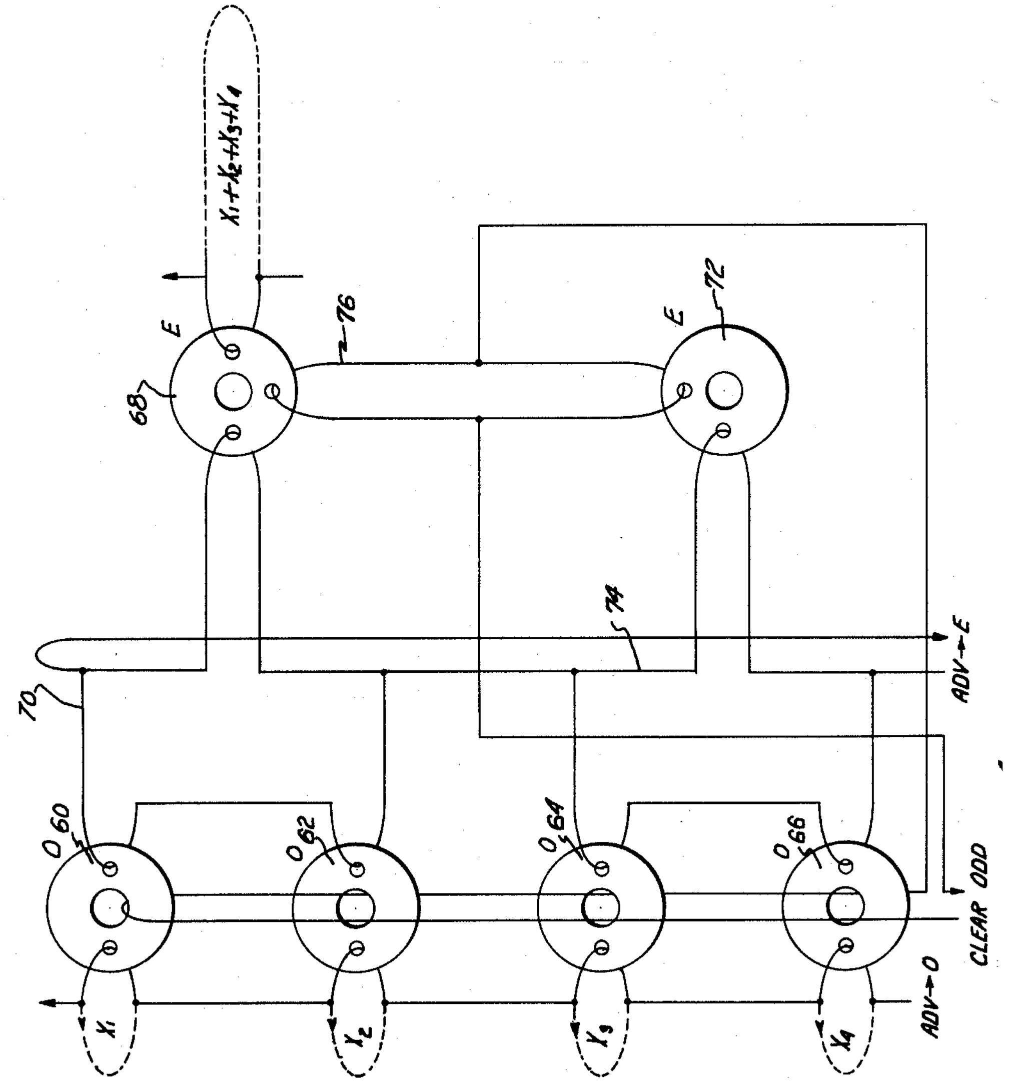
Fig. 4 shows a circuit for accomplishing a logical function in using the principles of the present invention.

One example of a useful circuit incorporating the technique described above in connection with Fig. 1 is shown in Fig. 4. In copending application Serial No. 710,149, filed January 20, 1958, in the name of Hewitt D. Crane and assigned to the assignee of the present invention, there is described a logical "or" circuit using multiple-apertured core devices of the type described above in connection with Fig. 1. The logical "or" circuit provides a plurality of input core elements for driving a single output core element by arranging the output windings of the input core elements in series as part of the transfer loop. However, as pointed out in the copending application on the logical "or" circuit, reliability of operation of the circuit decreases as the number of input core elements is increased. More than three inputs may exceed the practical limit of operation for the logical "or" circuit as described.

By using the technique of Fig. 1, a logical "or" circuit can be made for operation with more than three inputs. Fig. 4 shows an "or" circuit having four inputs, $X_1$, $X_2$, $X_3$, and $X_4$. The circuit includes four input core elements 60, 62, 64, and 66 respectively. The core elements are provided with input and output apertures in the same manner as the core elements described above in connection with Fig. 1. The input apertures of the core elements 60–66 are provided with input windings which may be simultaneously energized from the same transfer pulse source. The input core elements 60 and 62 are linked to a single output core element 68 by means of a transfer loop 70. The transfer loop includes a pair of series connected windings respectively linking the output apertures of the input core elements 60 and 62. Similarly the elements 64 and 66 are coupled to a core element 72 by means of a transfer loop 74. The transfer loops 70 and 72 may be energized from a single advance pulse source. Thus at advance time when a binary one is stored in either of the core elements 60 or 62, a binary one condition is transferred to the core element 68. Likewise if a binary one is stored in either of the core elements 64 or 66, it is transferred to the core element 72.

The core elements 68 and 72 are linked by a transfer loop 76 which is pulsed simultaneously with the clearing of the input core elements 60–66 from a common clear pulse source (not shown). Thus if a binary one has been transferred to the core element 72 from either of the core elements 64 or 66, at clear time a binary one will be transferred from the core element 72 to the core element 68. In this way, in one cycle of four clock pulses, a binary one can be read out of the core element 68 if a binary one has been read into any one of the four input core elements 60–66.

Figure 5:
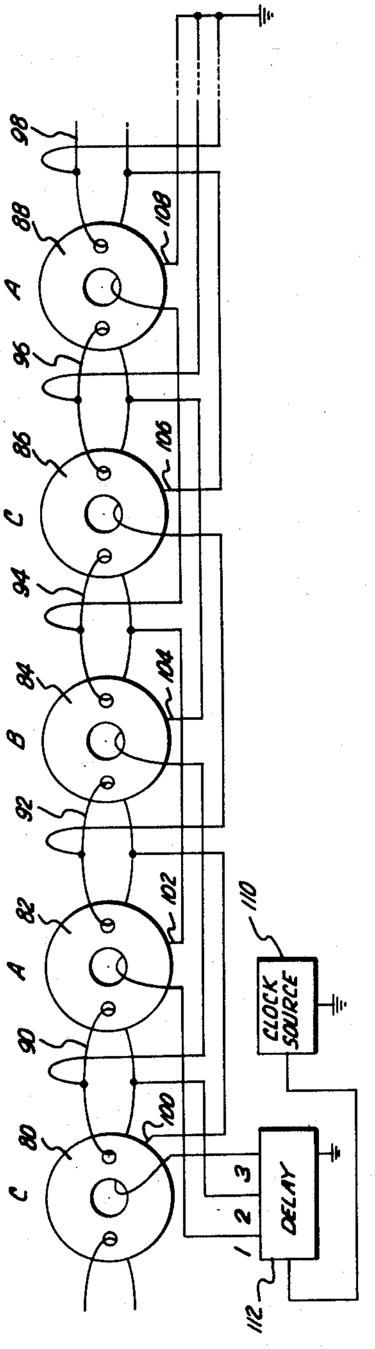
Figs. 5 and 6 are schematic diagrams of core register circuits incorporating the features of the present invention.

The circuit technique of Fig. 1 can be used to provide a shifting register requiring only three clock pulses per cycle instead of four clock pulses heretofore required in the above-mentioned copending applications. This shift register circuit, as shown in Fig. 5, requires three multi-aperture core elements per stored bit, the three core elements being designated A, B, C. Fig. 5 shows a portion of a string of core elements, the core elements being the same as the elements described above in connection with Fig. 1. Five core elements are indicated at 80, 82, 84, 86, and 88. Each pair of adjacent core elements are coupled by a transfer loop, as indicated at 90, 92, 94, 96, and 98 respectively. Each of the core elements is further provided with a clearing winding, as indicated at 100, 102, 104, 106, and 108 respectively.

A suitable clock source 110 is provided, the output of which is coupled to a delay line 112 by means of which each pulse from the source 110 gives rise to three successive pulses from three output taps on the delay line 112. The first output from the delay line 112 is connected to clearing windings associated with the core elements A of each group of three core elements storing a binary bit, e.g., the clear windings 102 and 108. The first output from the delay line 112 is also connected across the coupling loops linking the B and C core elements of each group of three, the coupling loops and clear windings being series connected so as to be simultaneously pulsed in response to the first output from the delay line 112.

Similarly the second output from the delay line 112 is connected to each of the clearing windings associated with the core elements B in the register, e.g., clear winding 104. The second output from the delay line 112 is also connected to the coupling loops linking the B core elements to the A core elements, e.g., the coupling loops 90 and 96. The coupling loops and clearing windings are connected in series with the output of the delay line 112 so as to be simultaneously pulsed by the second output from the delay line.

Similarly the third output from the delay line 112 is connected with the clearing windings associated with the core elements C in the chain, e.g., the clearing windings 100 and 106. The third output is also coupled to the transfer loops linking the core elements A and B in the chain, e.g., the transfer loops 92 and 98. The clearing windings and transfer loops are connected in series to the third output of the delay line 112 so as to be simultaneously pulsed by the third output.

From the above description of Fig. 5 it will be recognized that in operation, each group of three core elements operates in the manner of the three core elements of Fig. 1. Thus the first output pulse clears the A core elements and at the same time transfers information from the B core element to the C core element in each group of three. Similarly each of the other outputs from the delay line 112 clears one core element in a group of three while transferring information between the other two core elements in the group of three. In this manner, for each clock pulse from the source 110, an information bit is transferred from one core element A to the next core element A in the chain.

Figure 6:
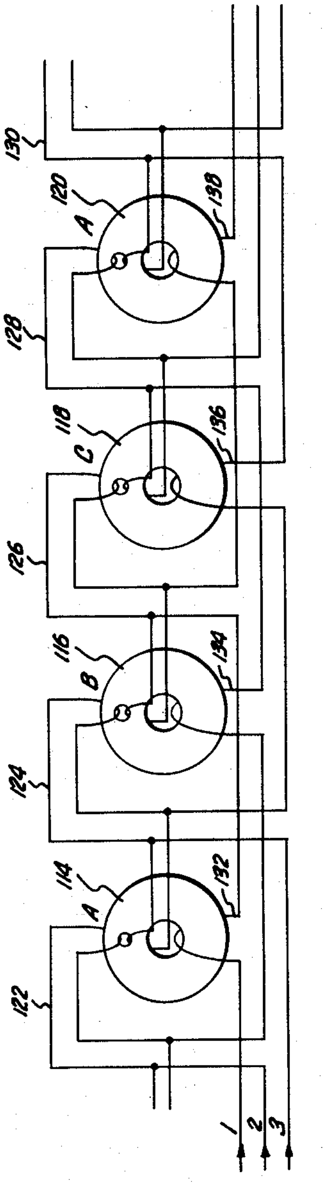

Using the modification of Fig. 3 described above in designing a triple-advance type of core register as described in connection with Fig. 5 gives rise to a circuit configuration as shown in Fig. 6. Core elements, as indicated at 114, 116, 118, and 120, each have a single common input and output aperture which is linked by the input transfer loop and the output transfer loop. As described above in connection with Fig. 3, the respective transfer loops link the inner and outer legs formed by the single aperture. The transfer loops are indicated at 122, 124, 126, 128, and 130 respectively. Each of the core elements is provided with a clearing winding as indicated at 132, 134, 136, and 138 respectively. The number 1 clock pulse input is connected in series with the clearing winding linking the A core elements and the transfer loops linking the B and C core elements, e.g., the clearing windings 132 and 138 and the transfer loop 126. The number 2 input is connected in series to the clearing windings on the B core elements and the transfer loops linking the C and A core elements, e.g., the clearing winding 134 and the transfer loops 122 and 128. The number 3 input is connected in series with the clearing windings linking the core element C and the coupling loops linking the core elements A and B, e.g., the clearing windings 136 and the coupling loops 124 and 130.

Operation is substantially identical to that of the circuit of Fig. 5, namely, the three clocks shift a binary bit from one core element A to the next core element A in successive groups of three core elements. This is accomplished by simultaneously clearing one of the core elements at the same time transfer is effected by the other two core elements in each group of three core elements.

From the above description it will be recognized that the circuit arrangement of Fig. 1 in which two core elements can be set from a single core element is of considerable importance in the design of logic circuits. For instance, in general, one transmitter core element can actually control several receiving core elements, as specifically described in copending application Serial No. 741,690, filed June 12, 1958, in the names of Hewitt D. Crane et al., and assigned to the assignee of the present invention. The present scheme approximately squares the number of receiving core elements controlled by a single transmitting core element without increasing the number of clock pulses in a transfer cycle. Thus as shown in Fig. 1, the transmitting core element 10 may actuate, for example, three core elements 11, and each of the three core elements 11, for example, may control three auxiliary core elements 48, making a total of nine auxiliary core elements controlled from a single transmitting core element by one cycle of four clock pulses. In this manner, the flexibility of core logic design is greatly increased.

What is claimed is:

1. Apparatus comprising three core elements of magnetic material having a high flux remanence characteristic, each of said core elements having a large opening, whereby the core elements each provide a relatively long closed magnetic flux path around the large opening therein, the core elements further having apertures therethrough that are much smaller than the large opening, each aperture dividing the adjacent portion of the associated core element into two parallel flux paths and defining a relatively short closed flux path in the associated core element around the small aperture, a first conductive coupling loop including a winding linking a first one of the three core elements through an aperture and a winding linking a second one of the three core elements through an aperture, a second conductive loop including a winding linking the second one of the three core elements through an aperture, and linking the third one of the three core elements through an aperture, a clearing winding linking said first core element through the large opening therein, the clearing winding being connected in series with the coupling loop linking the second and third core elements, whereby portions of a current passed through the clearing winding pass respectively through the two windings in said coupling loop for simultaneously clearing the first core element and transferring information from the second core element to the third core element, a pulsed constant current source coupled to said series connected clearing winding and coupling loop, the magnitude of the current from the source being limited to a value in the windings of the coupling loop slightly less than the current threshold required to switch the flux around the relatively long closed flux paths in the associated core elements, clearing windings respectively linking the second and third core elements through the central openings therein, means for respectively pulsing current through said clearing windings in excess of the threshold current level required to switch flux around the relatively long closed flux paths in the associated core elements, an input winding linking the first core element through an aperture, an output winding linking the third core element through an aperture, and means for pulsing a current through the windings forming the coupling loop between the first and second core elements and for pulsing a current through said output winding, said means limiting the current through the winding linking the first core element and limiting the current through the output winding to a value slightly below the threshold current level required to switch flux around the relatively long closed flux paths of the associated core elements.

2. Apparatus comprising three core elements of magnetic material having a high flux remanence characteristic, each of said core elements having a large opening, whereby the core elements each provide a relatively long closed magnetic flux path around the large opening therein, the core elements further having apertures therethrough that are much smaller than the large opening, each aperture dividing the adjacent portion of the associated core element into two parallel flux paths and defining a relatively short closed flux path in the associated core element around the small aperture, a first conductive coupling loop including a winding linking a first one of the three core elements through an aperture and a winding linking a second one of the three core elements through an aperture, a second conductive loop including a winding linking the second one of the three core elements through an aperture and linking the third one of the three core elements through an aperture, a clearing winding linking said first core element through the large opening therein, the clearing winding being connected in series with the coupling loop linking the second and third core elements, whereby portions of a current passed through the clearing winding pass respectively through the two windings in said coupling loop for simultaneously clearing the first core element and transferring information from the second core element to the third core element, a pulsed constant current source coupled to said series connected clearing winding and coupling loop, the magnitude of the current from the source being limited to a value in the windings of the coupling loop slightly less than the current threshold required to switch the flux around the relatively long closed flux paths in the associated core elements, clearing windings respectively linking the second and third core elements through the central openings therein, and means for respectively pulsing current through said clearing windings in excess of the threshold current level required to switch flux around the relatively long closed flux paths in the associated core elements.

3. Apparatus comprising three core elements of magnetic material having a high flux remanence characteristic, each of said core elements having a large opening, whereby the core elements each provide a relatively long closed magnetic flux path around the large opening therein, the core elements further having apertures therethrough that are much smaller than the large openings, each aperture dividing the adjacent portion of the associated core element into two parallel flux paths and defining a relatively short closed flux path in the associated core element around the small aperture, a first conductive coupling loop including a winding linking a first one of the three core elements through an aperture and a winding linking a second one of the three core elements through an aperture, a second conductive loop including a winding linking the second one of the three core elements through an aperture and linking the third one of the three core elements through an aperture, a clearing winding linking said first core element through the large opening therein, the clearing winding being connected in series with the coupling loop linking the second and third core elements, whereby portions of a current passed through the clearing winding pass respectively through the two windings in said coupling loop for simultaneously clearing the first core element and transferring information from the second core element to the third core element, and a pulsed constant current source coupled to said series connected clearing winding and coupling loop, the magnitude of the current from the source being limited to a value in the windings of the coupling loop slightly less than the current threshold required to switch the flux around the relatively long closed flux paths in the associated core elements.

4. Apparatus comprising at least three core elements of magnetic material having a high flux remanence characteristic, each of said core elements having a large opening, whereby the core elements each provide a relatively long closed magnetic flux path around the large opening therein, each of the core elements further having at least one aperture therethrough that is much smaller than the large opening, each aperture dividing the adjacent portion of the associated core element into two parallel flux paths and defining a relatively short closed flux path in the associated core element around the small aperture, a first conductive coupling loop including a winding linking a first one of the three core elements through an aperture and a winding linking a second one of the three core elements through an aperture, a second conductive loop including a winding linking the second one of the three core elements through an aperture and linking the third one of the three core elements through an aperture, and a clearing winding linking said first core element through the large opening therein, the clearing winding being connected in series with the coupling loop linking the second and third core elements, whereby portions of a current passed through the clearing winding pass respectively through the two windings in said coupling loop for simultaneously clearing the first core element and transferring information from the second core element to the third core element.

5. Apparatus as defined in claim 4 wherein the windings of the respective coupling loops linking the second core element pass through separate apertures in the second core element.

6. Apparatus as defined in claim 4 wherein the windings of the respective coupling loops linking the second core element pass through the same aperture in the second core element, the winding of one of the coupling loops linking the flux path formed on one side of the aperture and the winding of the other coupling loop linking the flux path formed on the other side of the aperture.

7. Apparatus as defined in claim 4 including a plurality of groups of said three core elements, a third conductive coupling loop including a winding linking an aperture in the third core element of one group and a winding linking an aperture in the first core element of the next group, whereby the successive groups are coupled in a continuous chain, the clearing winding of the second core element of one group being connected in series with the coupling loop between the third core of said one group and the first core of the next group and the clearing winding of the third core element being connected in series with the coupling loop between the first and second core elements of said next group, and means for successively pulsing three separate outputs, each of the three outputs being coupled respectively to each of the clearing windings of the three core elements in all of the plurality of groups, whereby every third element is cleared by the pulse from a respective one of the three outputs.

8. Apparatus as defined in claim 4 including a plurality of groups of said three core elements, a third conductive coupling loop including a winding linking an aperture in the third core element of one group and a winding linking an aperture in the first core element of the next group, whereby the successive groups are coupled in a continuous chain, the clearing winding of the second core element of one group being connected in series with the coupling loop between the third core of said one group and the first core of the next group and the clearing winding of the third core element being connected in series with the coupling loop between the first and second core elements of said next group.

9. Apparatus as defined in claim 8 wherein the windings of the respective coupling loops pass through separate apertures in each of the respective core elements.

10. Apparatus as defined in claim 8 wherein the windings of the respective coupling loops pass through the same aperture in each of the respective core elements, the winding of one of the coupling loops linking the flux path formed on one side of the aperture and the winding of the other coupling loop linking the flux path formed on the other side of the aperture in each of the respective core elements.

11. Apparatus as defined in claim 4 including at least one additional core element having a large opening therein defining a relatively long closed flux path around the opening and having at least one small aperture defining a relatively short closed flux path around the aperture, a fourth conductive coupling loop including a winding linking the additional core element through a small aperture therein and a winding linking the third core element through a small aperture therein, said fourth coupling loop being connected in series circuit with said first coupling loop, whereby the two coupling loops can be simultaneously energized from a common current source for simultaneously transferring information from the first core element to the second core element and from the additional core element to the third core element, and a clearing winding linking the additional core element through the large opening, said clearing winding being connected in series circuit with the clearing winding linking the first core element.

No references cited.